(12) United States Patent
Golding

(10) Patent No.: US 7,389,307 B2
(45) Date of Patent: Jun. 17, 2008

(54) RETURNING DATABASES AS SEARCH RESULTS

(75) Inventor: Andrew R. Golding, Waltham, MA (US)

(73) Assignee: Lycos, Inc., Waltham, MA (US)

( * ) Notice: Subject to any disclaimer, the term of this patent is extended or adjusted under 35 U.S.C. 154(b) by 399 days.

(21) Appl. No.: 09/927,015

(22) Filed: Aug. 9, 2001

(65) Prior Publication Data

US 2003/0033324 A1 Feb. 13, 2003

(51) Int. Cl.
*G06F 12/00* (2006.01)
*G06F 13/30* (2006.01)

(52) U.S. Cl. .......................... 707/200; 707/201; 707/3; 707/4; 707/5; 707/10; 715/513; 715/500.01

(58) Field of Classification Search ............... 707/1–10, 707/100–104.1, 200–201; 715/500.1, 513
See application file for complete search history.

(56) References Cited

U.S. PATENT DOCUMENTS

| | | | | |
|---|---|---|---|---|
| 5,634,053 A * | 5/1997 | Noble et al. | | 707/4 |
| 5,909,679 A * | 6/1999 | Hall | | 707/4 |
| 5,918,225 A * | 6/1999 | White et al. | | 707/3 |
| 5,950,195 A * | 9/1999 | Stockwell et al. | | 707/4 |
| 6,006,225 A * | 12/1999 | Bowman et al. | | 707/5 |
| 6,012,053 A * | 1/2000 | Pant et al. | | 707/3 |
| 6,026,396 A * | 2/2000 | Hall | | 707/4 |
| 6,052,693 A * | 4/2000 | Smith et al. | | 707/104.1 |
| 6,098,081 A * | 8/2000 | Heidorn et al. | | 707/3 |
| 6,169,986 B1 * | 1/2001 | Bowman et al. | | 707/5 |
| 6,243,713 B1 * | 6/2001 | Nelson et al. | | 707/3 |
| 6,263,335 B1 * | 7/2001 | Paik et al. | | 707/5 |
| 6,275,820 B1 * | 8/2001 | Navin-Chandra et al. | | 707/3 |
| 6,311,194 B1 * | 10/2001 | Sheth et al. | | 715/505 |
| 6,363,377 B1 * | 3/2002 | Kravets et al. | | 707/4 |
| 6,381,597 B1 * | 4/2002 | Lin | | 707/4 |
| 6,510,406 B1 * | 1/2003 | Marchisio | | 704/9 |
| 6,546,381 B1 * | 4/2003 | Subramanian et al. | | 707/2 |
| 6,564,213 B1 * | 5/2003 | Ortega et al. | | 707/5 |
| 6,587,858 B1 * | 7/2003 | Strazza | | 707/102 |
| 6,633,846 B1 * | 10/2003 | Bennett et al. | | 704/257 |
| 6,640,218 B1 * | 10/2003 | Golding et al. | | 707/2 |
| 6,671,681 B1 * | 12/2003 | Emens et al. | | 707/5 |
| 6,697,793 B2 * | 2/2004 | McGreevy | | 707/1 |
| 6,701,309 B1 * | 3/2004 | Beeferman et al. | | 707/3 |
| 6,732,088 B1 * | 5/2004 | Glance | | 707/3 |
| 6,742,004 B2 * | 5/2004 | Sabatini et al. | | 707/104.1 |
| 6,826,559 B1 * | 11/2004 | Ponte | | 707/3 |
| 6,829,604 B1 * | 12/2004 | Tifft | | 707/5 |
| 6,868,225 B1 * | 3/2005 | Brown et al. | | 386/83 |
| 2001/0037328 A1 * | 11/2001 | Pustejovsky et al. | | 707/3 |
| 2001/0049677 A1 * | 12/2001 | Talib et al. | | 707/3 |

(Continued)

OTHER PUBLICATIONS

Finkelstein et al.—"Placing Search in Context: The Concept Revisited" ACM May 2001 Hong Kong (pp. 406-414).*

(Continued)

*Primary Examiner*—Jean Bolte Fleurantin
*Assistant Examiner*—Anh Ly
(74) *Attorney, Agent, or Firm*—Fish & Richardson P.C.

(57) ABSTRACT

A method including enumerating plausible queries of a target database using query generation rules, and generating associated teasers for each of the enumerated queries using query matching rules.

15 Claims, 3 Drawing Sheets

U.S. PATENT DOCUMENTS

| | | | | |
|---|---|---|---|---|
| 2002/0087515 | A1* | 7/2002 | Swannack et al. | 707/2 |
| 2002/0099721 | A1* | 7/2002 | Ganapathy et al. | 707/104.1 |
| 2002/0103809 | A1* | 8/2002 | Starzl et al. | 707/102 |
| 2002/0107842 | A1* | 8/2002 | Biebesheimer et al. | 707/3 |
| 2002/0111958 | A1* | 8/2002 | Hartman et al. | 707/200 |
| 2002/0152202 | A1* | 10/2002 | Perro et al. | 707/3 |
| 2003/0200208 | A1* | 10/2003 | Sajwan et al. | 707/3 |
| 2004/0143571 | A1* | 7/2004 | Bjornson et al. | 707/3 |
| 2004/0172417 | A1* | 9/2004 | Hartman et al. | 707/104.1 |
| 2005/0091204 | A1* | 4/2005 | Melman | 707/3 |

OTHER PUBLICATIONS

The Metacrawler Architecture for Resource Aggregation on the Web, Erik Selberg, et al., pp. 1 to 4, Jan.-Feb. 1997.

Gloss: Text-Source Discovery over the Internet, Luis Gravano, et al., ACM Transactions on Database Systems, vol. 24, No. 2, Jun. 1999, pp. 229 to 264.

Experiences with Selecting Search Engines Using Metasearch, Daniel Dreilinger, et al., ACM Transactions on Information Systems, vol. 15, No. 3, Jul. 1997, pp. 195 to 222.

The Anatomy of a Large-Scale Hypertextual Web Search Engine, Sergey Brin, et al., Computer Science Department, Stanford University, (1998), 21 pages.

* cited by examiner

RETURNING DATABASES AS SEARCH RESULTS

TECHNICAL FIELD

This invention relates to returning databases as search results.

BACKGROUND

A Web-enabled search engine is software that receives search terms from a user and identifies documents on the Web that contain, or are otherwise associated with, those search terms. Conventional search engines create an inverted index of all the terms that occur in all the documents that have been spidered on the World Wide Web. The search engine receives a user query and attempts to match the user query with terms in the index. Uniform resource locators ("URLs") represent addresses of Web locations that contain hyperlinks that contain the full text of the identified documents within the index.

SUMMARY

In general, in one aspect, the invention features a method including enumerating plausible queries of a target database using query generation rules, and generating associated teasers for each of the enumerated queries using query-matching rules.

Implementations of this aspect may include one or more of the following features.

The method may include storing the enumerated queries and their associated teasers in a lookup table. The method may also include receiving a user query of the target database, determining whether the user query matches an enumerated query in the lookup table, and displaying the teaser associated with the enumerated query in response to determining. The query generation rules may be domain specific. The query matching rules may be domain specific. Generating may also include conflict resolution rules. The target database may reside on a server connected to the Internet.

In general, in another aspect, the invention features a method including identifying queries that match elements in a target database, receiving a user query, determining if the user query matches one of the identified queries, and if the user query matches one of the identified queries, providing target database information to a user that relates to the user query.

Implementations of this aspect may include one or more of the following features.

The database may reside on a server. The server may reside in a network. Identifying may include applying query-generation rules to the target database, applying query-matching rules to each of the queries to generate associated teasers, and building a mapping from the queries to their associated teasers. Building a mapping may include storing the queries and associated teasers in a hash table. Building a mapping may include storing the queries and associated teasers in a cache. Building a mapping may include storing the queries and associated teasers in a trie data structure.

In general, in another aspect, the invention features a method including pre-processing a target database, building a mapping from selected queries to associated teasers for the target database, receiving a user query for the target database, and returning an associated teaser if the user query matches one of the selected queries.

Implementations of this aspect may include one or more of the following features.

Pre-processing may include identifying selected queries in conjunction with query-generation rules, and generating an associated teaser for each of the selected queries in conjunction with query-matching rules. Building a mapping may include storing each of the selected queries with the associated teaser. Storing may include placing each of the selected queries with associated teaser in a trie data structure. Storing may include placing each of the selected queries with associated teaser in a hash table. Storing may include placing each of the selected queries with associated teaser in a cache. Storing may include placing each of the selected queries with associated teaser in a lookup table. The method may also include displaying the associated teaser.

Embodiments of the invention may have one or more of the following advantages.

The method enables receipt of an arbitrary user query input, decides whether it matches the database, and if it does, returns a description of the best matching parts of the database, displayed as teasers.

Because matching of the database can be slow if it is done intelligently using domain knowledge, the method may be split into two stages, i.e., a pre-processing stage in which a mapping from queries to teasers is built for all queries that match the database, and a run-time stage in which the query is looked up in the mapping.

The method entails matching the user's query against an element in the database, and summarizing the best match found in a descriptive hyperlinked text string, or teaser. To minimize run-time computation, the method uses query-generation rules to anticipate all plausible queries that can match elements in the database. To match the query against database elements intelligently, the method uses query-matching rules. The query-generation and query-matching rules encode heuristic knowledge of the domain of the database.

The method not only returns search results per se, but also can be tied to other related tasks, such as targeted advertising of the contents of the database.

Other features and advantages of the invention will become apparent from the following description and the claims.

DETAILED DESCRIPTION

Figure 1:
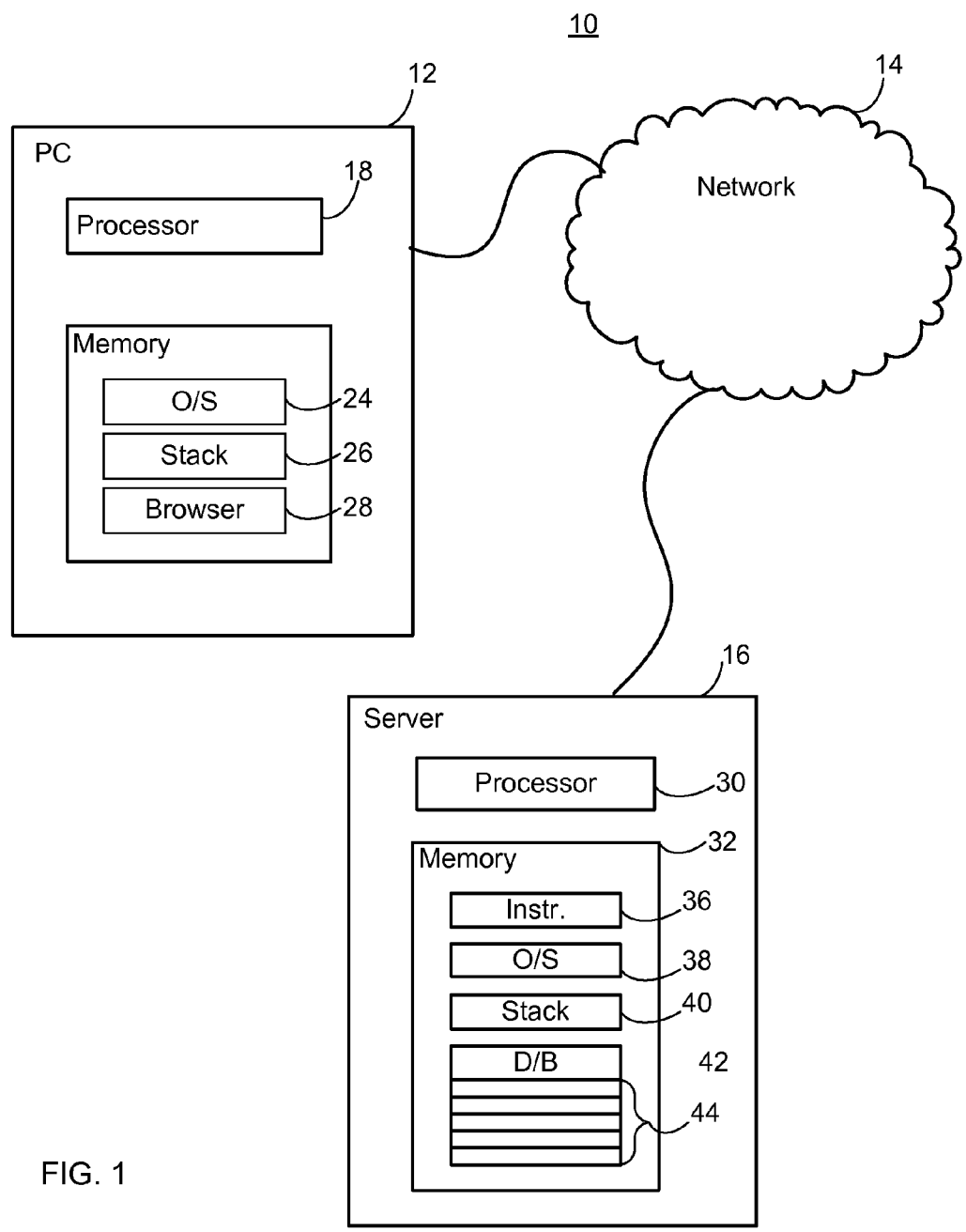
FIG. 1 is a block diagram of a computer network.

Referring to FIG. 1, a computer network 10 includes a computer 12, such as a personal computer (PC), connected to a communication network 14, such as the Internet, which uses TCP/IP (Transmission Control Protocol/Internet Protocol) or another suitable protocol. Connections in the network 10 may use Ethernet, a wireless link, a telephone line, and so forth. Communications network 14 contains a server 16, which may be a mainframe computer, a PC, or any other type of processing device.

The computer 12 contains a processor 18 and a memory 20. The memory 20 stores an operating system 24 such as Windows98® or Linux, a TCP/IP protocol stack 26 for communicating over the network 14, and a Web browser 28 such as Internet Explorer® or Netscape Navigator®, for accessing Web sites and pages hosted by devices such as server 16 on network 10.

The server 16 contains a processor 30 and a memory 32. The memory 32 stores machine-executable instructions 36, an operating system 38, a TCP/IP protocol stack 40 and a database 42. Instructions 36 may be part of an Internet search engine or not, and are executed by processor 30 to perform processes 50 (FIG. 2) and 100 (FIG. 3). That is, a user at computer 12 uses Web browser 28 to access server 16, which, in response, executes instructions 36 to perform the processes described below.

Figure 2:
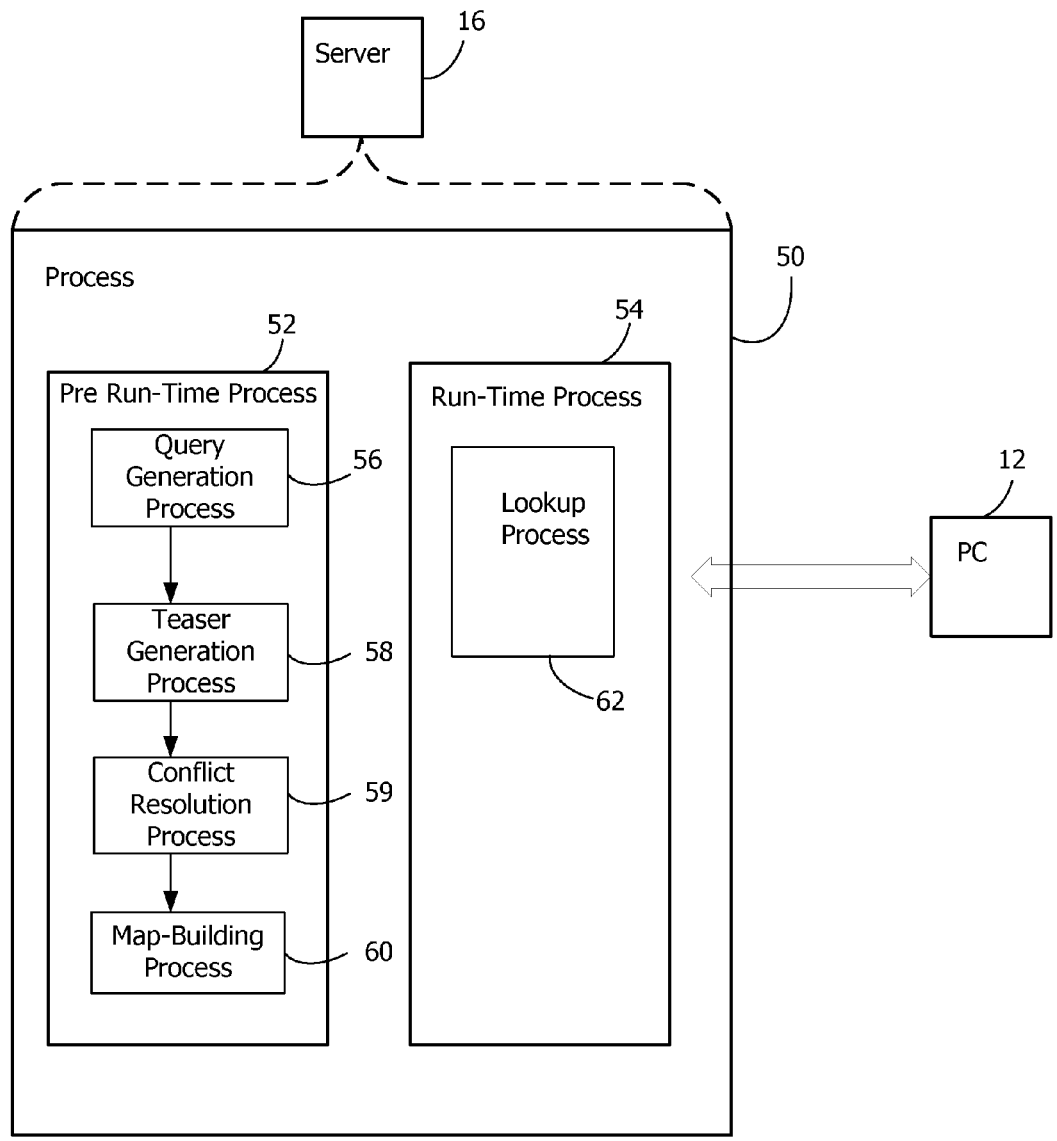
FIG. 2 is a diagrammatic view of a process for returning a database as a search result in response to a user query.
Figure 3:
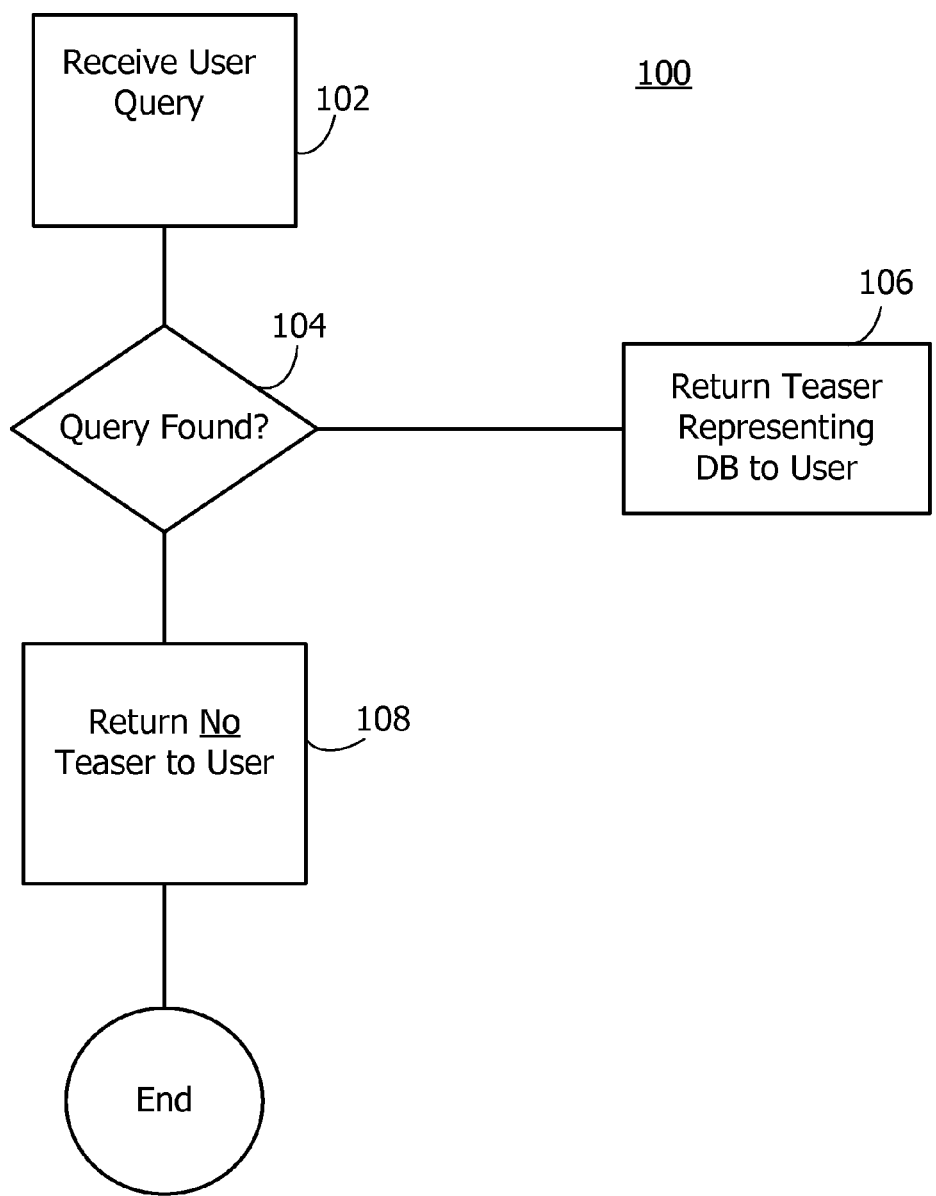
FIG. 3 is a flowchart of a process for returning a database as a search result.

Referring to FIG. 2, there is shown a process 50 that returns the database 42 as a teaser in response to a user query. The database may be stored locally on server 16 or on any other server or combination of servers connected to the network 14. Often information contained on the World Wide Web ("the Web") is structured not as a plain text document, but rather as a database. For example, there are restaurant databases and car databases and databases for almost anything. Searching databases involves different technologies than are used for searching text documents, since databases have greater structure and associated semantics than text documents. For example, when searching a database, one may use the knowledge that a particular field of the database contains a person's name, and therefore use special name-matching heuristics to match the contents of the field to a user query. For instance, one might allow the query to match just the surname in the name field, or to match the surname followed by a comma followed by the given name. These kinds of matches cannot be done reliably in an unstructured text document. Process 50 includes a pre-runtime process 52 and a runtime process 54.

Pre-runtime process 52 enumerates all potential user queries that are reasonable queries to ask about the contents of the database 42 so that the system is ready for queries received in real time by the run time process 54. For each query, a "best" teaser, or short excerpt, to give of the database to describe the best results of the database for that query is produced. Databases contain content having multiple elements 44. Each of the elements represents content. Content may be provided in response to a user query. Enumerating all potential user queries is implemented in a query-generation process 56. The query-generation process 56 utilizes query-generation rules or heuristics to enumerate a set of queries that can plausibly be asked about each element in the database. The query-generation rules are stored in the memory of the server 16.

For example, if someone is trying to ask for a particular restaurant, the query generation rules suggest what phrases the user might use. Thus, for a seafood restaurant, a user might give a generic phrase such as "seafood restaurant" or "fish". Or the user might give a more specific query involving a name of a restaurant, such as "Legal Seafoods" or just "Legal".

These query-generation rules are domain-specific, e.g., one needs to know something about restaurants to be able to generate restaurant queries. It is preferred that the query generation rules be derived using a learning procedure. The learning procedure works with queries that users have actually given, together with, for example, the restaurants that they have received as acceptable responses to these queries. Thus, one can record user sessions and notice that, for instance, if users type "seafood" as a query, the users end up clicking on "Legal Seafoods" as their notice of an acceptable response. That gives one a training example that lets one learn that one query that users type when they are interested in the restaurant "Legal Seafoods" is the query "seafood". If the learning procedure is also given the information that "seafood" is the type of cuisine served by "Legal Seafoods," then the learning procedure can use the above training example as evidence to infer the following query-generation rule: users may ask for a restaurant by entering its type of cuisine.

Documents tend to be open-ended pieces of information, whereas a database is a much more structured type of collection of information. Using knowledge about the domain of the database, one can determine the types of queries users may ask. In summary, for a Boston restaurant database example, the query-generation rules generate the name of a restaurant (and sub-strings of the name), its location, the type of cuisine, and perhaps the name of the head chef and his or her signature dish(es). The query-generation process 56 captures the types of phrases that users would tend to provide as queries if they were interested in the restaurant. The rules annotate each query they produce with the database element, and the field within that element, that the query was generated from. For example, the rules for a restaurant domain may specify that the query "legal" is generated from the restaurant name of the "Legal Seafoods" database element, the query "kendall square" is generated from the location of this element, and so forth.

The query-generation rules for a domain are developed by learning from training examples of users' queries together with the database elements that satisfied the queries. Such training examples may be obtained in E-commerce applications, where users demonstrate that they are satisfied with a database element by purchasing it.

A teaser generation process 58 uses output from the query-generation process 56. Once the query generation process 56 has generated a query, the teaser generation process 58 finds the best excerpts from the database in response to that query. Here again domain specific knowledge is utilized. For example, in the restaurant domain, knowledge about the subject of restaurants can be used to do a more intelligent form of matching. If a user types the word "fish," one can use knowledge of the restaurant domain to determine that the majority of restaurant names that match that query have the same cuisine, which in this example is seafood. One can therefore infer that the user is interested in seafood restaurants. This is an example of a domain specific inference.

The teaser generation process 58 utilizes query matching rules or heuristics. It is preferred to find all of the database entries that match a query for any reason, or, in other words, they match by any of the different rules. Thus, the teaser generation process 58 generates the best teaser for each query enumerated by the query-generation process 56. More specifically, teaser generation process 58 takes an arbitrary user query as input, decides whether it matches the target database, and if it does, returns a description of the best-matching parts of the database. These descriptions are called teasers. For example, suppose a user enters the query "tomatoes". An example of a teaser that might be returned to the user for a book database would be "Find How to Make Pasta Sauces and other books on Tomatoes."

To find the best teaser for a query, the teaser generation process 58 collects all instances of that query, together with their annotations, that were produced by the query-generation process 56. For example, for the query "fish," there might have been six instances generated:

1. "fish": From name of Naked Fish Restaurant
2. "fish": From name of Jimbo's Fish Shanty
3. "fish": From name of The Village Fish
4. "fish": From name of Vaughan's Fish & Chips
5. "fish": From chef Michael Fish of Mike's Barbecue
6. "fish": From chef Michael Fish of Mike's Barbecue II Finding the best teaser for the query amounts to finding the most likely database element(s), if any, suggested by the data above, that a user who types the query "fish" would be looking for. This is accomplished in the teaser generation process 58 by applying query-matching rules. Query-matching rules include two parts: the rules themselves, which propose ways of matching the query against different fields of the database elements; and a conflict-resolution process, which controls how to break ties among the rules.

As an example of a query-matching rule for the Boston restaurant domain, consider the following:

Dominant Cuisine Rule:
    IF most or all restaurants whose names match the query have the same cuisine (C)
    THEN propose teaser: "(R) and other Boston (C) restaurants"
    where (R) is the name of the most popular Boston restaurant with cuisine (C)

The "IF" portion of a rule is referred to as the antecedent portion of the rule. Applied to the six instances of the "fish" query above, the Dominant Cuisine Rule would notice that four out of four restaurants whose names match the query have seafood as their cuisine, and that therefore a plausible interpretation of the "fish" query is that the user is interested in Boston seafood restaurants. The rule further infers that the user will be interested in the most popular Boston seafood restaurant, which is taken here to be Legal Seafoods, even though this restaurant does not contain "fish" in its name. The rule therefore suggests the teaser: "Legal Seafoods and other Boston seafood restaurants."

After all query-matching rules have executed, a conflict resolution process 59 is invoked if necessary to break ties. The conflict resolution process 59 uses conflict resolution rules or heuristics to decide which of a number of query-matching rules provides the best interpretation of the user's query. It is preferred that the conflict resolution rules involve a notion of popularity of the database elements that are being recommended. One simply compares the mass of evidence, or the total popularity of the evidence that is being suggested by each query-matching rule, and assumes that, a priori, the rule with the most evidence will be the one that will most likely satisfy the user. Thus, a natural strategy is to select the query-matching rule whose matching database elements, i.e., the elements that match the antecedent of the rule, have the greatest popularity. This selects the rule whose elements have, a priori, the maximum likelihood of being of interest to the user. In practice, popularity of database elements can be estimated from sales counts in the case of E-commerce domains, sales ranks assuming sales counts follow a known distribution, or click counts in the case of selectable items.

Concluding the "fish" example above, suppose that a second rule matches the six database elements above:

Matching Chef Rule:
    IF query matches the surname of a chef (C) at more than one restaurant
    THEN propose teaser: "(R) and (C)'s other Boston restaurants."
    where (R) is chef (C)'s most popular restaurant This rule suggests the teaser: "Mike's Barbecue and Michael Fish's other Boston Restaurants." At this point, conflict-resolution process 59 is invoked to decide between the Dominant Cuisine Rule and the Matching Chef Rule. Using the maximum likelihood strategy mentioned above, presumably the total popularity of all seafood restaurants with "fish" in their name will exceed the popularity of Michael Fish's restaurants. Thus the final teaser will be: "Legal Seafoods and other Boston seafood restaurants."

A map building process 60 constructs a mapping from queries to teasers to display for each query. If no query-matching rule matches for a query, then the query is omitted from the mapping. The actual mapping may be represented internally as any data structure that supports fast retrieval, such as tries, hash tables or lookup tables. Caching results of lookup can further speed up retrieval.

During the run-time process 54, a user query is received from a user on the computer system 12 by a lookup process 62. The lookup process 62 determines whether the user query has been found in the mapping data structure. If the query is found, the teaser for that query, as given by the mapping, is sent to the user as a search result. The search result represents the database as an associated teaser that is displayed to the user. If the lookup process cannot find the user's query in the mapping, no teaser is returned for display to the user.

Now referring to FIG. 3, there is shown a process 100 for returning a teaser representing a database as a search result. A user query is received 102 by a lookup process. The lookup process determines 104 whether the user query is found in a mapping data structure. The mapping data structure represents a set of pre-processed user queries and associated teasers. If the user query is found in the mapping data structure, a search result containing an associated teaser that represents the database is returned 106 to the user for display. If the user query is not found in the mapping data structure, no teaser is returned 108 to the user in response to the query.

Other embodiments are within the scope of the following claims. For example, the method may also include presenting the teaser in conjunction with advertising. This advertising can be specifically targeted to the user by relating it to the user query. The query-matching rules can include additional text that relates to the proposed teaser.

What is claimed is:

1. A computer-implemented method comprising:
    obtaining instances of a query for a database using one or more query generation rules, the database comprising elements, the elements comprising fields, the one or more query generation rules obtaining the instances of the query by annotating the query with at least one of the elements and corresponding fields of the database;
    generating a teaser that corresponds to the query, the teaser comprising text that is based on the instances of the query;
    wherein generating the teaser comprises:
        obtaining a common feature among the instances of the query by matching the instances of the query to one or more fields of the database;
        using the common feature to generate the teaser; and
        executing a conflict resolution rule that identifies the teaser as a most popular one of plural teasers; and
    outputting the teaser;
    wherein the teaser is generated using one or more query matching rules, the one or more query matching rules being domain specific, the domain corresponding to a subject matter of the database.

2. The computer-implemented method of claim 1, further comprising storing the query and the teaser in a lookup table, the query and the teaser so stored comprising a stored query and a stored teaser, respectively.

3. The computer-implemented method of claim 2, further comprising:
    receiving an input query for the database;
    determining whether the input query matches the stored query; and
    displaying the stored teaser if the input query matches the stored query.

4. The computer-implemented method of claim 1, wherein the one or more query generation rules are domain specific, the domain corresponding to a subject matter of the database.

5. The computer-implemented method of claim 1, wherein the database resides on a server connected to the Internet.

6. Machine-readable memory that contains instructions that are executable to cause at least one processing device to:
   obtain instances of a query for a database using one or more query generation rules, the database comprising elements, the elements comprising fields, the one or more query generation rules obtaining the instances of the query by annotating the query with at least one of the elements and corresponding fields of the database;
   generate a teaser that corresponds to the query, the teaser comprising text that is based on the instances of the query;
   wherein generating the teaser comprises:
      obtaining a common feature among the instances of the query by matching the instances of the query to one or more fields of the database;
      using the common feature to generate the teaser; and
      executing a conflict resolution rule that identifies the teaser as a most popular one of plural teasers; and
   output the teaser;
   wherein the teaser is generated using one or more query matching rules, the one or more query matching rules being domain specific, the domain corresponding to a subject matter of the database.

7. The machine-readable memory of claim 6, further comprising instructions to store the query and the teaser in a lookup table, the query and the teaser so stored comprising a stored query and a stored teaser, respectively.

8. The machine-readable memory of claim 7, further comprising instructions to:
   receive an input query for the database;
   determine whether the input query matches the stored query; and
   display the stored teaser if the input query matches the stored query.

9. The machine-readable memory of claim 6, wherein the one or more query generation rules are domain specific, the domain corresponding to a subject matter of the database.

10. The machine-readable memory of claim 6, wherein the database resides on a server connected to the Internet.

11. An apparatus comprising:
    memory that stores instructions that are executable; and
    at least one processing device configured to execute the instructions to:
       obtain instances of a query for a database using one or more query generation rules, the database comprising elements, the elements comprising fields, the one or more query generation rules obtaining the instances of the query by annotating the query with at least one of the elements and corresponding fields of the database;
    generate a teaser that corresponds to the query, the teaser comprising text that is based on the instances of the query;
    wherein generating the teaser comprises:
       obtaining a common feature among the instances of the query by matching the instances of the query to one or more fields of the database;
       executing a conflict resolution rule that identifies the teaser as a most popular one of plural teasers;
       using the common feature to generate the teaser; and
    output the teaser;
    wherein the teaser is generated using one or more query matching rules, the one or more query matching rules being domain specific, the domain corresponding to a subject matter of the database.

12. The apparatus of claim 11, wherein the at least one processing device is configured to execute instructions to store the query and the teaser in a lookup table, the query and the teaser so stored comprising a stored query and a stored teaser, respectively.

13. The apparatus of claim 11, wherein the at least one processing device is configured to execute instructions to:
    receive an input query for the database;
    determine whether the input query matches the stored query; and
    display the stored teaser if the input query matches the stored query.

14. The apparatus of claim 11, wherein the one or more query generation rules are domain specific, the domain corresponding to a subject matter of the database.

15. The apparatus of claim 11, wherein the database resides on a server connected to the Internet.

* * * * *

UNITED STATES PATENT AND TRADEMARK OFFICE
CERTIFICATE OF CORRECTION

| | | |
|---|---|---|
| PATENT NO. | : 7,389,307 B2 | |
| APPLICATION NO. | : 09/927015 | |
| DATED | : June 17, 2008 | |
| INVENTOR(S) | : Andrew R. Golding | |

It is certified that error appears in the above-identified patent and that said Letters Patent is hereby corrected as shown below:

In the Claims:

Column 8, Line 18, in Claim 11, after "database;":

INSERT -- using the common feature to generate the teaser; and --.

Column 8, Line 20, in Claim 11:

DELETE "teaser:" and INSERT -- teaser; --, therefor.

Signed and Sealed this
Twenty-first Day of February, 2012

David J. Kappos
*Director of the United States Patent and Trademark Office*